T. A. Searle,
Liquid Meter.
No. 87,516. Patented Mar. 2, 1869.
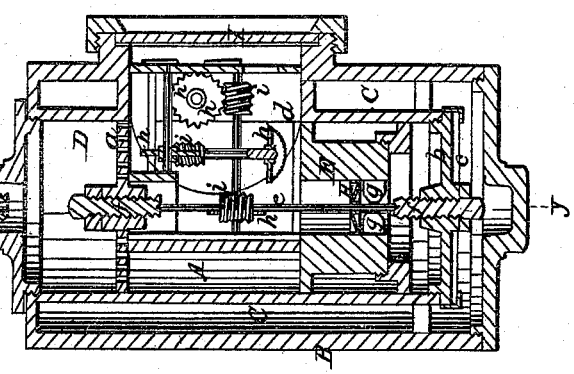
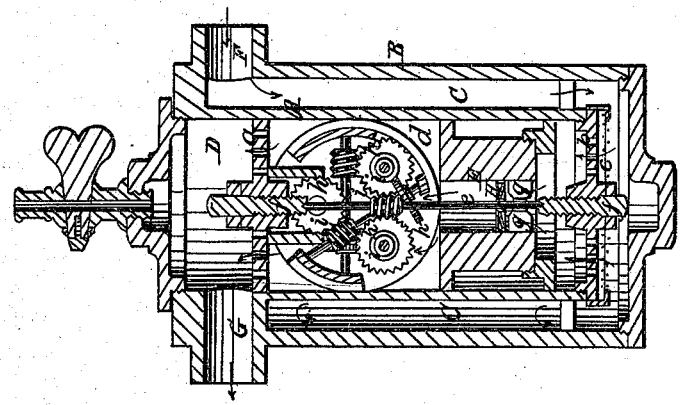
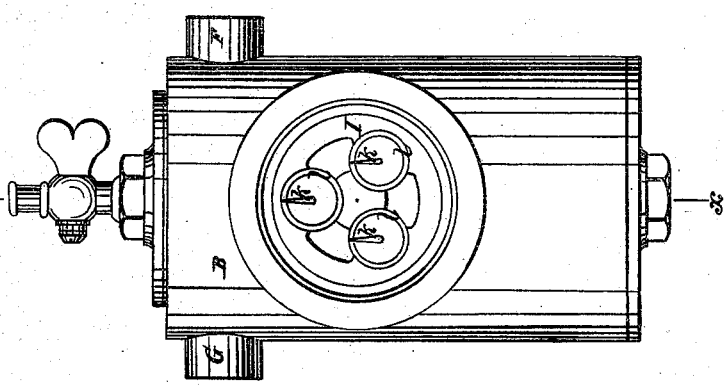
Witnesses,
Inventor,
T. A. Searle

UNITED STATES PATENT OFFICE.

THOMAS A. SEARLE, OF PROVIDENCE, RHODE ISLAND.

Letters Patent No. 87,516, dated March 2, 1869.

IMPROVEMENT IN LIQUID-METERS.

The Schedule referred to in these Letters Patent and making part of the same

*To all whom it may concern:*

Be it known that I, THOMAS A. SEARLE, of Providence, in the county of Providence, and State of Rhode Island, have invented a new and useful Improvement in Water or other Liquid-Meters, of which the following is a full, clear, and exact description, reference being had to the accompanying drawing, forming part of this specification, and in which—

Figure 1 represents a front elevation of a water-meter, embracing my improvements;

Figure 2, a vertical section, taken as indicated by the line $x\ x$ in fig. 1; and Figure 3, a vertical section, taken as denoted by the line $y\ y$ in fig. 2.

Similar letters of reference indicate corresponding parts.

My invention consists in a novel arrangement of inner and outer cylinders, relatively to the inlet and outlet-passages of the meter, in combination with perforated diaphragms to the inner cylinder and interposed flutter or registering-wheel, and whereby a more correct action of the said wheel and measurement of the water or other liquid are obtained.

Referring to the accompanying drawing—

A represents a cylinder or case, surrounded by a jacket, or other cylinder, B, arranged to leave an annular or intervening space, C, between them.

In the upper portion of the inner cylinder A, is a chamber or space, D, which is separated from the portion of said cylinder lying beneath it by a perforated diaphragm, $a$, and said inner cylinder is furthermore provided at its bottom with a perforated diaphragm, $b$, and under screen $c$.

This inner cylinder, A, is likewise fitted internally with a cylinder, E, which is so constructed or arranged as to shut off all communication, excepting through it, between the lower portion of the cylinder A and upper part or chamber $d$ thereof F is the inlet-pipe, for the water, situated at or near the top of the jacket B; and G, the outlet-pipe, arranged to open into or connect with the chamber D.

The cylinder E has located within it a horizontal flutter-wheel, H, with spiral buckets, the shaft or spindle $e$ of which works in bearings $f\ f$.

From this description, it will be seen that water, under a head or pressure, entering by the pipe F, and falling or working down the space C, between the cylinder A and jacket B, has its course diverted and checked in its way up through the screen $c$, perforated diaphragm $b$, cylinder E, chamber $d$, and through the perforated diaphragm $a$, into the chamber D to the outlet G.

As the water passes upward through the wheel H, its upward pressure counteracts the effect of the weight of the said wheel and its spindle, and so reduces the friction in the lower bearing of the spindle; and owing to the circuitous course it is obliged to take, and to the larger area of the passage C, through which it passes from the inlet to the outlet, and to the checking-action to which it is subjected in passing through the perforated diaphragms, the effect of any momentum which it might have acquired is overcome, and its action on the wheel is only such as is due to the head or pressure, and the rotary motion which it imparts to the wheel is only such as is due to the quantity of water passing through, and therefore the wheel, acting upon the indicating and registering-mechanism, will always be correct.

The chamber $d$ contains the registering-apparatus, consisting of wheels $h\ h\ h\ h\ h$, and screws $i\ i\ i\ i\ i$, or other suitable devices, deriving their motion from the rotating spindle $e$ of the flutter-wheel, the wheels $h\ h\ h$, which face the front of the meter, operating index-hands $k\ k\ k$, working over or against suitable dials $l\ l\ l$, to indicate measurements of tens, hundreds, and thousands, or in other proportions, the quantity of water passed through the meter in a given time.

By this arrangement of the registering-apparatus, within the chamber $d$, all stuffing-box provisions are dispensed with, there being none of necessity either to the flutter or registering-wheel, and the dials $l\ l\ l$ being read from the outside of the meter, and the water precluded from escaping through the front of the meter, by means of a glass or transparent plate, I, arranged in front of the chamber $d$.

What is here claimed, and desired to be secured by Letters Patent, is—

The arrangement of the cylinder A and jacket B, with their intervening space C, relatively to the inlet F and outlet G, perforated diaphragms $a\ b$, and cylinder E, with its flutter or registering-wheel H, substantially as specified.

THOS. A. SEARLE.

Witnesses:
HENRY MARTIN,
JOHN C. PURKIS.